United States Patent
Yamaguchi et al.

[11] Patent Number: 5,829,408
[45] Date of Patent: Nov. 3, 1998

[54] INTERNAL COMBUSTION ENGINE AND AIR-FUEL MIXTURE SUPPLY APPARATUS THEREFOR

[75] Inventors: Jun'ichi Yamaguchi; Minoru Ohsuga; Ryoichi Komro; Takuya Shiraishi, all of Katsuta, Japan

[73] Assignee: Hitachi, Ltd., Tokyo, Japan

[21] Appl. No.: 880,442

[22] Filed: Jun. 23, 1997

Related U.S. Application Data

[63] Continuation of Ser. No. 609,420, Mar. 1, 1996, abandoned, which is a continuation of Ser. No. 336,674, Nov. 7, 1994, abandoned.

[30] Foreign Application Priority Data

Nov. 8, 1993 [JP] Japan .................................. 5-278719

[51] Int. Cl.⁶ .................................................. F02B 31/00
[52] U.S. Cl. ............................................................ 123/308
[58] Field of Search ............................................. 123/308

[56] References Cited

U.S. PATENT DOCUMENTS

| | | | |
|---|---|---|---|
| 4,553,514 | 11/1985 | Namba et al. | 123/308 |
| 4,714,063 | 12/1987 | Oda et al. | 123/308 |
| 4,811,231 | 3/1989 | Hataoka et al. | 123/308 |
| 5,150,691 | 9/1992 | Imajo | 123/308 |

FOREIGN PATENT DOCUMENTS

| | | |
|---|---|---|
| 0137393A2 | 9/1984 | European Pat. Off. . |
| 445 945 | 10/1967 | Germany . |
| 57-68519 | 4/1982 | Japan . |
| 61-58921 | 4/1986 | Japan . |
| 3-185213 | 8/1991 | Japan . |

*Primary Examiner*—Noah P. Kamen
*Attorney, Agent, or Firm*—Antonelli, Terry, Stout & Kraus, LLP

[57] ABSTRACT

An air-fuel mixture supply apparatus includes an intake passage opening to a combustion chamber in a cylinder, an intake valve provided between the intake passage and the combustion chamber, a fuel injection valve for injecting at least one of branched spray flows directing to the intake valve, a swirl generator generates vortex flow in the mixture in the combustion chamber by controlling to choke the intake passage. The swirl generator comprises a main passage forming the intake passage, at least one of sub-intake passages which is provided to form a by-pass passage of the main passage and formed such that the total sum of the cross-sectional areas is smaller than the cross-sectional area of the main passage, an intake control valve for controlling the choke of the main passage, a valve for controlling the choke at least one of the sub-intake passages, a controller for varying the number of the sub-intake passages to be used and the cross-sectional area of each of the sub-intake passages corresponding to the operating state of the internal combustion engine, and another controller for varying the direction of fuel injection and the number of fuel injections corresponding to the operating state of the internal combustion engine.

17 Claims, 12 Drawing Sheets

INTERNAL COMBUSTION ENGINE AND AIR-FUEL MIXTURE SUPPLY APPARATUS THEREFOR

This is a continuation of application Ser. No. 08/609,420, filed Mar. 1, 1996, abandoned; which is a continuation of application Ser. No. 08/336,674, filed Nov. 7, 1994 abandoned.

BACKGROUND OF THE INVENTION

The present invention relates to an air-fuel mixture supply apparatus and, more particularly, to an air-fuel mixture supply apparatus which generates a swirl inside a combustion chamber of an internal combustion engine depending on the operating state of the engine to promote combustion with a lean air-fuel ratio. The invention is suitable for a lean-burn engine system which stratifies the air-fuel mixture at a lean air-fuel ratio.

The features of so-called lean burn engine technology are well known. Therein, in order to obtain output power compatible with economy, an engine is operated with a lean mixture during low load operation of the engine to improve the fuel consumption rate, at other times, with a theoretical air-fuel ratio or power air-fuel ratio to increase output power.

Two main methods to attain lean air-fuel ratio operation are known. The first method is to generate a swirl flow inside a combustion chamber during leanburn to maintain a better combustion even in a uniform lean mixture by promoting flame propagation; and, the second method involves producing a deviation in distribution of the mixture, that is, distribution in air-fuel ratio to maintain a state of lean mixture as a whole, as well as to maintain a firing of the mixture, resulting in so-called stratified combustion.

Among the above methods, the first technology utilizing a swirl calls for one of two inlet ports in an engine of two-inlet valve type to be a straight port having a suction control valve and the other to be a helical port having a by-pass flow passage opened by the suction control valve, as described in, for example, Japanese Patent Application Laid-Open No.61-58921 (1986). According to such a construction, during a low load operation of the engine, a strong swirl is generated inside the combustion chamber by sucking the air-fuel mixture only through the helical port side by closing the suction control valve. On the other hand, during a high load operation of the engine, in order to keep output power high, the swirl is weakened and the amount of intake air is increased by opening the suction control valve to let the air flow through the helical port and the straight port, as well as the by-pass flow passage communicating between the straight port side and the helical port side.

The second technology, involving stratified combustion, as described in Japanese Patent Application Laid-Open No. 3-185213 (1991), during a low load operation of the engine, causes the distribution of the air-fuel ratio to be deviated by changing the fuel flow rate flowing into the intake port, during which a tumble flow, a kind of swirl, is generated inside the combustion chamber by using a different an intake port of different shape from that of the conventional port.

In an internal combustion engine employing these methods, it is preferable to produce an optimum distribution of air-fuel ratio and a swirl of optimum strength corresponding to the operating state of the engine. More particularly, during a low load operation of the engine, it is required to promote a lean mixture by stratified combustion as well as to increase the strength of the swirl to improve the ability of burning. On the other hand, during a high load operation of the engine, in order to increase the output power, it is required to increase the utilization factor of air used for combustion by making the mixture inside the combustion chamber uniform, as well as to weaken the swirl and suck a large amount of air.

The internal combustion engine constructed as described above has the following disadvantages.

The engine has a disadvantage in that, since the swirl generating mechanism is provided in the main air flow passage, it is difficult to weaken the swirl during a high load operation of the engine, and the resistance of the air intake flow passage becomes large in comparison to that in the conventional internal combustion engine. Therefore the intake air flow rate is decreased and the output power is degraded.

Further, the engine utilizing stratified combustion has a disadvantage in that, since the distribution of the mixture cannot be made uniform even during a high load operation of the engine, the utilization factor of air is decreased in comparison to that of the conventional internal combustion engine, which leads to a decrease in output power or degradation in the quality of the exhaust gas.

Furthermore, the engine has a disadvantage in that, since the spray of fuel becomes attached to the wall of the inlet suction flow passage or to the wall of the combustion chamber, or the spray of fuel tends to drift to a peripheral part of the combustion chamber due to the swirl flow, the fuel near the cylinder wall is exhausted in an unburned state, which leads to an increase in unburned hydrocarbon in the exhaust gas and an increase in the fuel consumption.

SUMMARY OF THE INVENTION

The present invention aims to solve the above problems, and the object of the present invention is to provide an air-fuel mixture supply apparatus for an internal combustion engine having the following features.

Firstly, the internal combustion engine comprises means capable of maintaining a high output power by maintaining a sufficient amount of intake air during a high load operation of the engine, and by means capable of improving the combustion efficiency by generating a swirl of appropriate strength depending on the speed of the engine during a low load operation of the engine.

Secondly, the internal combustion engine comprises means capable of increasing the utilization factor of air and maintaining a high output power by attaining a compatibility of the lean air-fuel ratio and the firing capability by stratifying the air-fuel mixture during a low load operation of the engine and by uniformly introducing a large amount of the air-fuel mixture into the combustion chamber during a high load operation of the engine.

Thirdly, the internal combustion engine comprises means for producing a mixture capable of suppressing exhaust gases of HC, NOx by preventing the fuel spray from attaching to the walls of the intake pipe or the combustion chamber during stratified combustion.

In order to attain the above objects, an air-fuel mixture supply apparatus for an internal combustion engine according to the present invention basically has an intake passage opening to a combustion chamber in a cylinder, an intake valve provided in a junction between said intake passage and said combustion chamber, a fuel injection valve for injecting one or more fuel spray flows directed to said intake valve, swirl generating means for generating a vortex flow in the mixture in said combustion chamber by controlling air flow in said intake passage, wherein said swirl generating means comprises a main passage forming said intake passage, one or more sub-intake passages provided to form a by-pass of said main passage and formed such that the total sum of the cross-sectional areas thereof is smaller than the cross-sectional area of said main passage, an intake control valve for controlling air flow in said main passage, valve means for performing control air flow in at least one of said sub-intake passages, means for performing control to vary the number of said sub-intake passages to be used and the cross-sectional area of each of the sub-intake passages corresponding to the operating state of the internal combustion engine, and means for performing control to vary the direction of fuel injection and the number of fuel injection sprays corresponding to the operating state of the internal combustion engine.

And, another embodiment of an air-fuel mixture supply apparatus for internal combustion engine according to the present invention has an intake passage opening to a combustion chamber in a cylinder, an intake valve provided in a junction between said intake passage and said combustion chamber, a fuel injection valve for injecting one or more branched spray flows directed to said intake valve, swirl generating means for generating a vortex flow in the mixture in said combustion chamber by controlling the air flow in said intake passage, wherein said swirl generating means comprises a main passage forming said intake passage, one or more sub-intake passages provided to form a by-pass of said main passage and formed such that the total sum of the cross-sectional areas thereof is smaller than the cross-sectional area of said main passage, an intake control valve for controlling air flow in said main passage, valve means for performing control to air flow in at least one of said sub-intake passages, and means for generating a swirl with varying strength corresponding to the operating condition of the internal combustion engine.

With the construction described above, the present invention has the following features.

Firstly, since there is no need to provide any swirl generating means inside the main air flow passage itself, the intake flow resistance of the main passage is small and consequently a larger amount of air can be sucked during a high load operation.

Since the cross-sectional area of the intake passage can be varied in multi-steps by varying the number of the sub-intake passages to be used, the swirl generated in the combustion chamber can be set so as to have a proper strength over an wider operating range of the engine than the range obtained when using a conventional apparatus. Thereby, it is possible to improve the total combustion efficiency under various operating conditions of the internal combustion engine.

Since the amount of intake air sucked through the sub-intake passage is increased by the inertia effect of the intake flow in the sub-intake passage, the range for operating with a generating swirl can be widened by the effect.

A plurality of swirls can be generated in the combustion chamber by using a plurality of sub-intake passages. Thereby, the disturbance in the combustion chamber under the same amount of intake air flow can be increased as compared to a case of one swirl, and consequently the combustion efficiency is improved by promotion of the mixing between the fuel and the air.

Since the means for varying the number of fuel sprays and the direction of fuel injection is provided, a stratified intake flow can be formed by deviating the fuel flow in the combustion chamber during a low load operation of the internal combustion engine, through lessening the number of fuel sprays and/or deviating the direction of fuel injection. On the other hand, during a high load operation of the internal combustion engine, the utilization factor of air can be increased and a high output power of the internal combustion engine can be attained by generating a uniform mixture through increasing the number of fuel sprays and controlling the direction of fuel injection so that the mixture becomes uniform inside the combustion chamber.

Further, the fuel is prevented from drifting near the wall surface of the combustion chamber by adjusting the injection timing of the fuel, the timing of ignition or the direction of fuel injection in such manner that a plurality of swirls are formed around the sprayed fuel and the fuel and the sucked air do not interfere each other. Thereby, the amount of hazardous components, such as HC, in the exhaust gas can be decreased.

DETAILED DESCRIPTION OF THE PREFERRED EMBODIMENTS

The embodiments according to the present invention will be described below, referring to the accompanying drawings. In the drawings, for describing the embodiments, parts having the same function are identified by the same reference numerals, and any overlapping description will be omitted.

Figure 1:
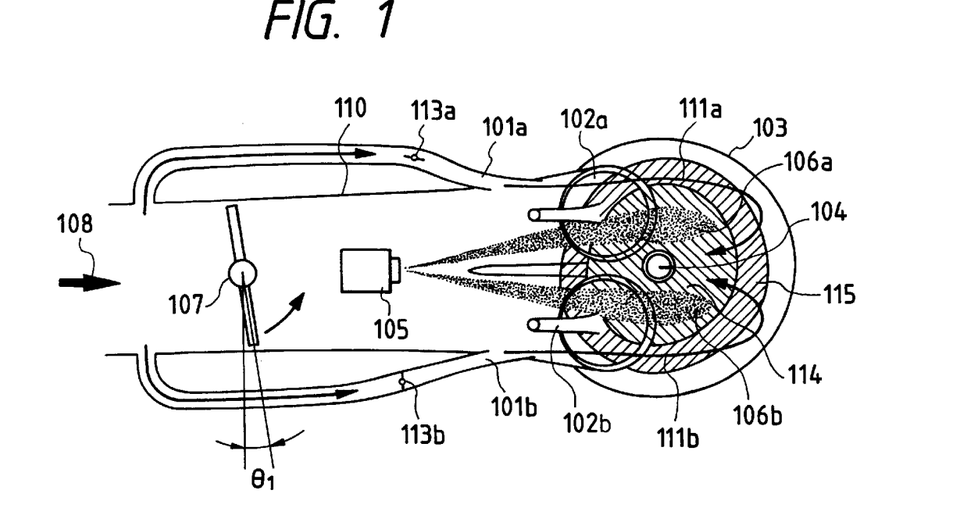
FIG. 1 is a diagrammatic plan view showing the construction of a first embodiment in accordance with the present invention.
Figure 2:
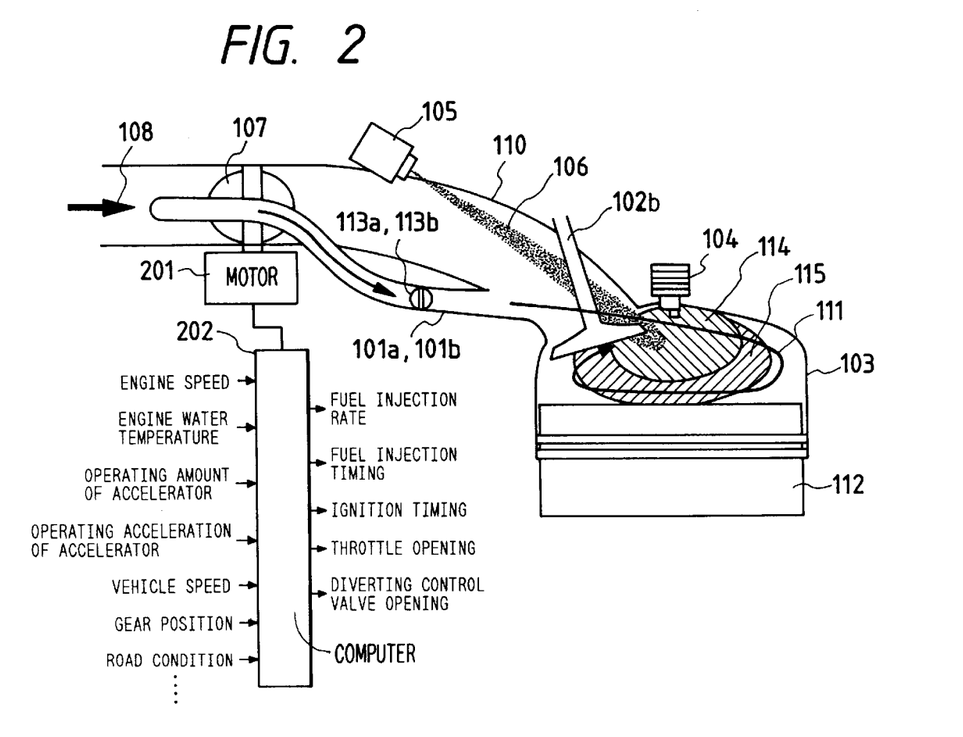
FIG. 2 is a diagrammatic side view showing the construction of the first embodiment in accordance with the present invention.

FIG. 1 and FIG. 2 show the construction of a first embodiment according to the present invention. A main passage 110 of an independent intake pipe is connected to and opens into a combustion chamber 103 of an engine having two intake valves 102a and 102b. An intake control valve 107 is provided in the main passage 110 and sub-intake passages 101a and 101b are provided from the up-stream side of the main passage 110 so as to by-pass the intake control valve 107. Swirl control valves 113a and 113b are provided in the sub-intake passages 101a and 101b, respectively. Herein, the total sum of the cross-sectional areas of the two sub-intake passages 101a and 101b is set so as to become equal to ⅕ to ½ of the cross-sectional area of the main passage 110 up-stream thereof.

The fuel injecting valve 105 produces two sprays 106a and 106b directed from the main passage 110 toward the opposite inner sides of valve portions of the intake valves 102a and 102b, that is, in two directions toward the center side of the combustion chamber, and the valve 105 has means for varying the number and the direction of sprays, as will be described later. Further, a spark plug 104 is provided near the center of the combustion chamber.

The exits of the sub-intake passage 101a and 101b open in the vicinity of the intake valves 102a and 102b. The air flowing through the sub-intake passages 101a and 101b is formed into two jets and enter into the combustion chamber 103 through two gaps between the intake valves and valve seats of the two intake valves 102a and 102b to generate two swirls 111a and 111b. At this time, the air flows in such a manner that the swirl 111a three-dimensionally enfolds the spray 106a and the swirl 111b enfolds the spray 106b, and further the air circulates along the surface of the piston 112, as seen in FIG. 2. As the result, a dense mixture produced region 114 and a lean mixture produced region 115 are formed. Driving of the intake control valve 107 is performed by, for example, a stepping motor 201 or the like. Driving of the swirl control valves 113a, 113b is also performed by, for example, stepping motors (not shown). The setting of the opening degree of each of the valves is performed by a computer 202.

Operating states, from a state of a small quantity of air to a state of a large quantity air, will be described below in four separate stages in the order of low load operation, a low and middle load operation, middle and high load operation and high load operation, referring to FIG.3 to FIG.6.

Figure 3:
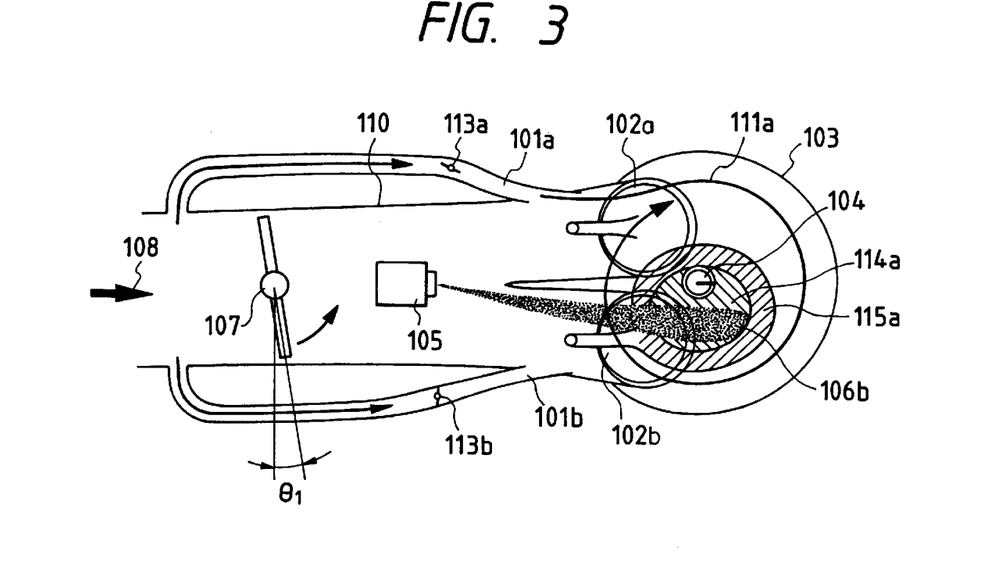
FIG. 3 is a diagrammatic plan view showing the operation of the first embodiment during a low load operation.

FIG. 3 shows the operating state of the first embodiment during a low load operation. The opening degree of the intake control valve 107 is set to an opening degree of $\Theta 1$, near a complete closing state, so that the air flowing in the main passage through the valve may be as small a quantity as ⅕ to ¹⁄₁₀ of the air flow rate flowing through the sub-intake passages and the locking of the valve may be prevented. The swirl control valve 113a is kept open and the swirl control valve 113b is closed. The air 108 flowing up-stream of the main passage 110 passes through the sub-intake passage 101a to generate a swirl 111a inside the combustion chamber 103. Since the diameter of the injected flow from the sub-intake passage 101a is small compared to the size of the combustion chamber, the air flow sucked through the intake valve 102a can be deviated enough to form a strong swirl 111a with a small flow rate of air.

The fuel injecting valve 105 is set so as to produce only one spray 106b using means for varying the number of sprays, as will be described later. At this time, the swirl 111a circulates so as to enfold the fuel spray 106b. Thereby, the spray is not allowed to drift toward the wall of the combustion chamber 103, a dense mixture produced region during combustion can be restricted approximately to a small space, as illustrated by the diagonally shaded area 114a in the figure, and the dense mixture is formed only in the vicinity of the spark plug. The lean mixture produced region is as indicated by the numeral 115a. Due to the stratified mixture and the effect of promoting combustion, better operation of an engine without combustion fluctuations can be obtained up to the air-fuel ratio of around 30, the fuel consumption rate can be decreased and the hazardous exhaust gases such as HC, NOx can be decreased.

Figure 4:
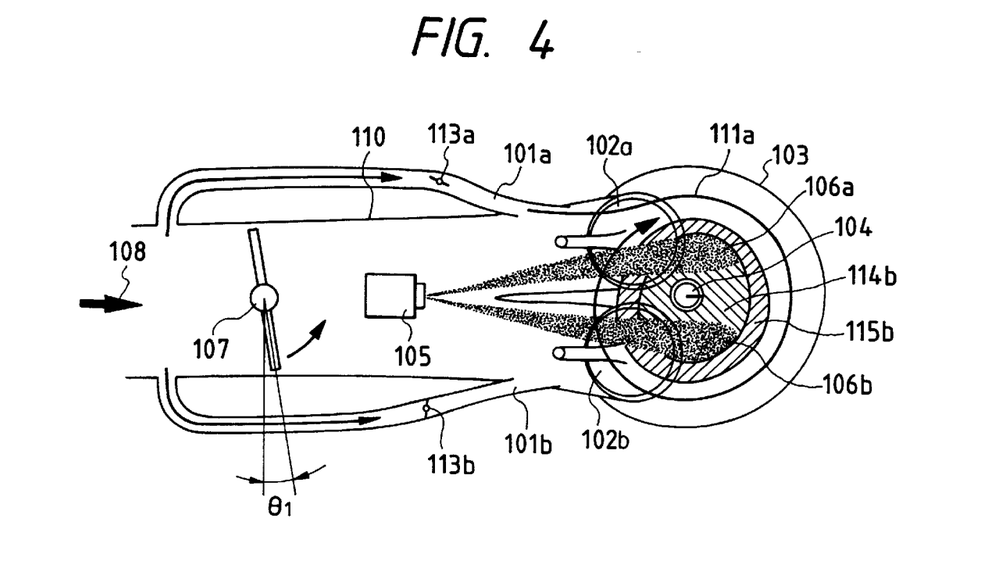
FIG. 4 is a diagrammatic plan view showing the operation of the first embodiment during a low and middle load operation.

FIG. 4 shows the operating state of the first embodiment during a low and middle load operation. The opening degree of the intake control valve 107 is set to an opening degree of $\Theta 1$, which is the same as in the low load operation. As shown in FIG. 4, the swirl control valve 113a is kept open and the swirl control valve 113b is closed. The air 108 flowing up-stream of the main passage 110 passes through the sub-intake passage 101a to generate a swirl 111a inside the combustion chamber 103. Since the diameter of the injected flow from the sub-intake passage 110a is small compared to the size of the combustion chamber, the air flow sucked through the intake valve 102a can be deviated enough to form a strong swirl 111a with a small flow rate of air.

The fuel injecting valve 105 is set so as to produce two sprays 106a, 106b using means for varying the number of sprays, as will be described later. At this time, the swirl 111a circulates so as to enfold the two fuel sprays 106a, 106b, and a dense mixture produced region 114b and a lean mixture produced region 115b, having wider areas than during the low load operation are produced. Also, since the fuel sprays 106a, 106b are enfolded by the swirl 111a, the spray is not allowed to drift toward the wall of the combustion chamber 103. Thereby, by forming a proper stratified mixture and generating a swirl for a larger quantity of fuel flow rate than during the low load operation, the air-fuel ratio can be increased up to 26 at a maximum.

Figure 5:
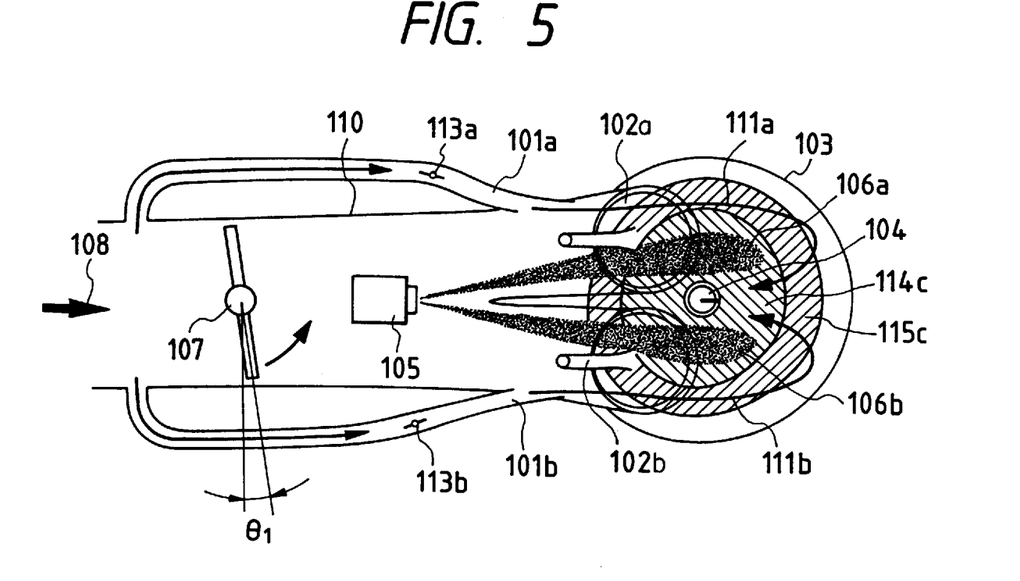
FIG. 5 is a diagrammatic plan view showing the operation of the first embodiment during a middle and high load operation.

FIG. 5 shows the operating state of the first embodiment during a middle and high load operation. The opening degree of the intake control valve 107 is set to an opening degree of Θ1, which is the same as in the low load operation and in the low and middle load operation. As shown in FIG. 5, both of the swirl control valves 113a, 113b are kept open. The air 108 flowing up-stream of the main passage 110 passes through the two sub-intake passages 101a and 101b to generate two swirls 111a and 111b inside the combustion chamber 103.

The fuel injecting valve 105 is set so as to produce two sprays 106a, 106b using means for varying the number of sprays, as will be described later. At this time, the swirls 111a, 111b circulate so as to enfold the fuel sprays 106a, 106b, respectively, and a dense mixture produced region 114c and a lean mixture produced region 115c, having wider areas than during the low and middle load operation, are produced. Also, since the fuel sprays 106a, 106b are enfolded by the swirls 111a, 111b respectively, the sprays are not allowed to drift toward the wall of the combustion chamber 103. Thereby, by forming a proper stratified mixture and generating a swirl for a larger quantity of fuel flow rate than during the low and middle load operation, the air-fuel ratio can be increased up to 24 at a maximum.

Figure 6:
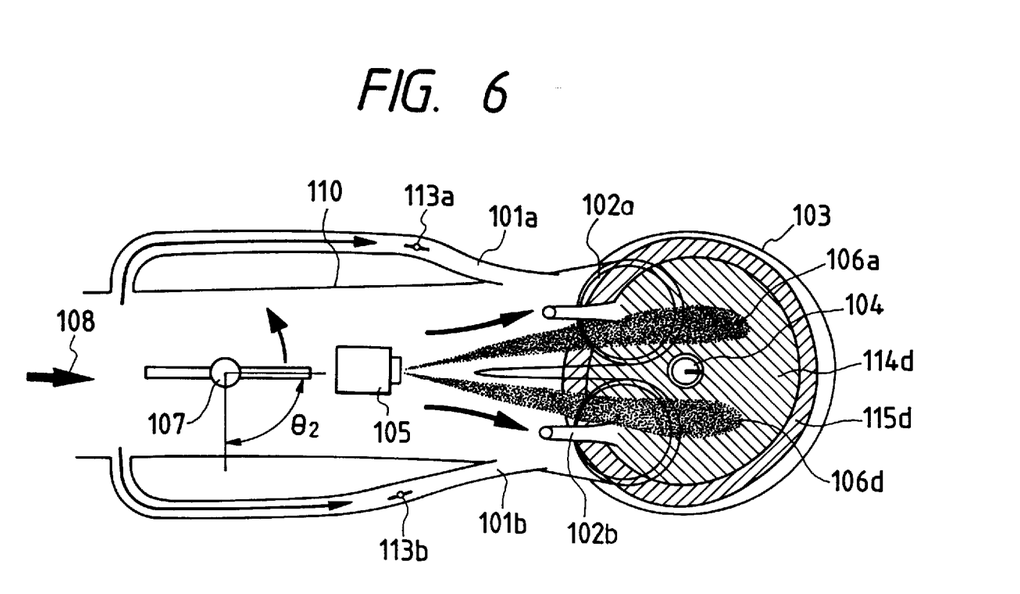
FIG. 6 is a diagrammatic plan view showing the operation of the first embodiment during a high load operation.

Next, FIG. 6 shows the operating state of the first embodiment during a high load operation. The opening degree of the intake control valve 107 is set to an opening degree of Θ2 in which the main passage 110 is kept wide open. At this time, most of the sucked air 108 passes through the main passage 110 and enters the combustion chamber 103. In the figure as illustrated, since there is no swirl generating means, such as helical port or the like, in the main passage 110, a large quantity of air can be sucked. On this occasion, the states of the swirl control valves 113a and 113b are not specified. Even if the swirl control valves 113a, 113b are kept open, the air flow rates through the sub-intake passages 101a, 101b are small and do not generate any swirl since the air flow rate flowing in each of the passages is approximately proportional to the cross-sectional area. The fuel injecting valve 105 is set so as to produce two sprays 106a, 106b using means for varying the number of sprays, as will be described later, and a lean mixture produced region 115d and a dense mixture produced region 114d are produced. In this case, the lean mixture region 115b occupies only the vicinity of the wall surface where the combustion efficiency is low, and most of the combustion chamber is occupied by the dense mixture region 114d of uniform mixture. The air-fuel ratio is set to a theoretical air-fuel ratio of 14.7, and may be varied to around 12 depending on necessity. Since sufficient air can be sucked, the required output power can be obtained.

Although in the embodiment the intake control valve 107 is described as being operated only in the ON/OFF state, that is, closing or opening the main passage for the sake of convenience, it is to be understood that the ratio of air flow rate through the main passage 110 can be controlled depending on the intake air flow rate, and consequently the region for generating a swirl can be further expanded.

Figure 7:
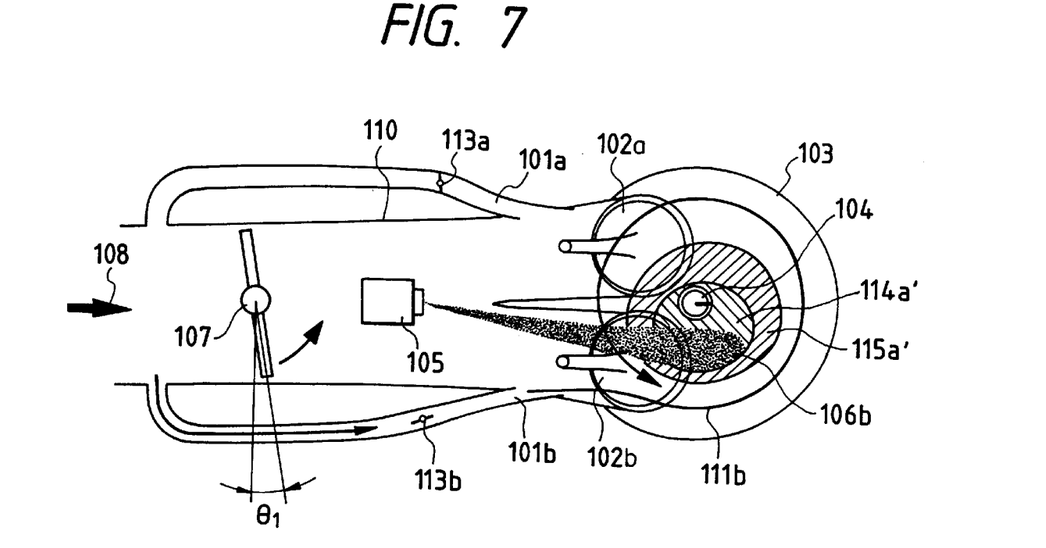
FIG. 7 is a diagrammatic plan view showing the operation of another type of the first embodiment during a low load operation.

FIG. 7 shows the operating state of another type of the first embodiment during a low load operation. The opening degree of the intake control valve 107 in the illustrated figure is set to an opening degree of Θ1, which is the same as in the low load operation in the previous embodiment. The swirl control valve 113a is closed and the swirl control valve 113b is kept open. The air 108 flowing up-stream of the main passage 110 passes through the sub-intake passage 101b to generate a swirl 111b inside the combustion chamber 103. Since the diameter of the injected flow from the sub-intake passage 101b is small compared to the size of the combustion chamber, the air flow sucked through the intake valve 102b can be deviated enough to form a strong swirl 111b with a small flow rate of air.

The fuel injecting valve 105 is set so as to produce only one spray 106b using means for varying the number of sprays, as will be described later. At this time, the swirl 111b circulates so as to enfold the fuel spray 106b. Thereby, the spray is not allowed to drift toward the wall of the combustion chamber 103, the dense mixture produced region during combustion can be restricted approximately in a small space, as illustrated by the diagonally shaded area 114a' in the figure, and the dense mixture is formed only in the vicinity of the spark plug. The lean mixture produced region becomes as indicated by the numeral 115a'. Due to the stratified mixture and the effect of promoting combustion, better operation of an engine without combustion fluctuations can be obtained up to the air-fuel ratio of around 30, the fuel consumption rate can be decreased and hazardous exhaust gases such as HC, $No_x$, can be decreased.

Figure 8:
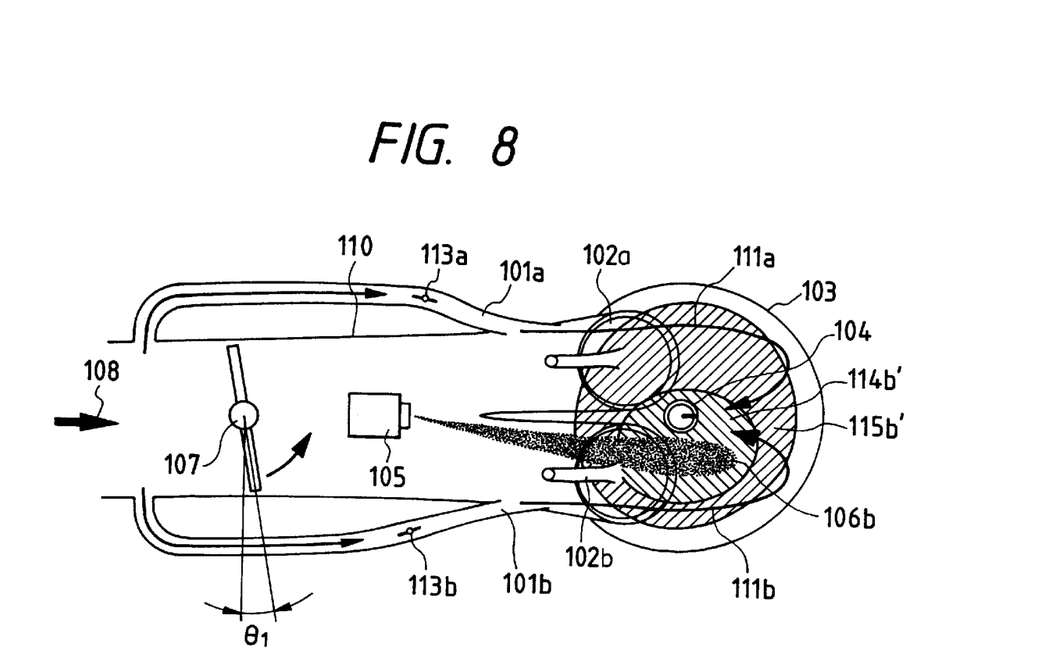
FIG. 8 is a diagrammatic plan view showing the operation of another type of the first embodiment during a low and middle load operation.

FIG. 8 shows the operating state of another type of the first embodiment during a low and middle load operation. The opening degree of the intake control valve 107 is set to an opening degree of Θ1, which is the same as in the low and middle load operation in the previous embodiment. Both of the swirl control valves 113a, 113b are kept open. The air 108 flowing up-stream of the main passage 110 passes through the two sub-intake passages 101a and 101b to generate two swirls 111a and 111b inside the combustion chamber 103.

The fuel injecting valve 105 is set so as to produce one spray 106b using means for varying the number of sprays, as will be described later. The swirl 111b circulates so as to enfold the fuel spray 106b, and a dense mixture produced region 114b' is produced. On the other hand, the swirl 111a circulates so as to enfold the dense mixture produced region 114b', and a lean mixture produced region 115b' having a wider area than during the low and middle load operation is produced. Also, since the fuel spray 106b is enfolded by the swirl 111b, the spray is not allowed to drift toward the wall of the combustion chamber 103. Thereby, by forming a proper stratified mixture and generating a swirl for a larger quantity of fuel flow rate than during the low load operation, the air-fuel ratio can be increased up to around 26 at a maximum.

Figure 9A:
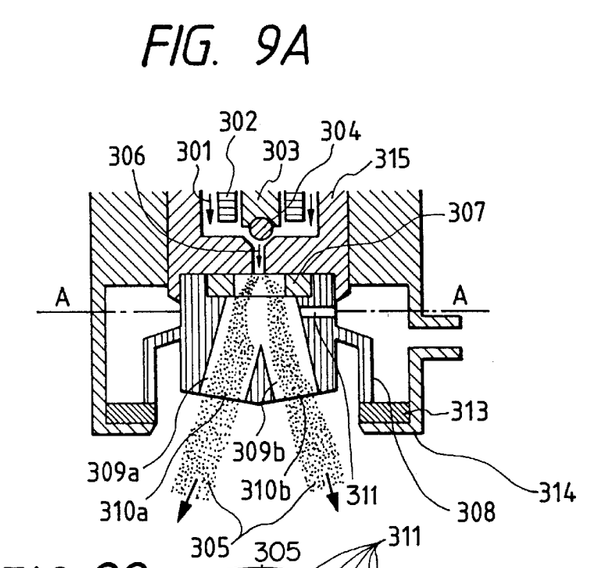
FIG. 9A and FIG. 9B are a plan view and a side view, respectively, showing the construction and the operation of a first embodiment of a fuel injecting valve in the first embodiment.
Figure 9B:
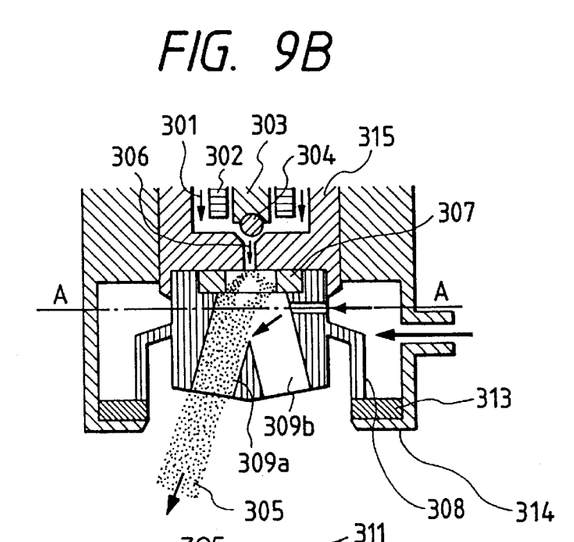
Figure 9C:
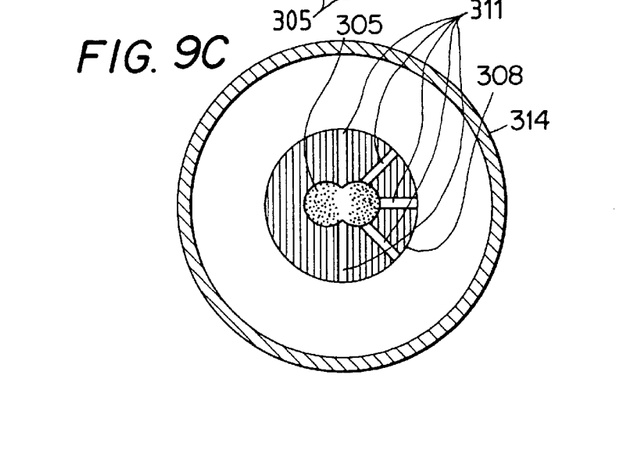
FIG. 9C and FIG. 9D are section views taken along line A—A in FIGS. 9A and 9B, respectively.

FIG. 9A and FIG. 9B show the construction and the operation of a first embodiment of a fuel injecting valve used in an air-fuel mixture supply apparatus for an internal combustion engine according to the present invention. Fuel 301 is pumped by a fuel pump which is not shown in the figure. With lifting and opening of a valve 304 by moving a core 303 when a pulse current flows in a coil 302, the fuel 301 is injected from a fuel orifice 306 as a spray 305. The amount of the fuel is determined by a function of the current flowing time in the coil 302 and the diameter of the fuel orifice 306. The fuel discharged from the fuel orifice 306 is branched into two directions by a branching part 307. In a case where the required number of the fuel spray flows is two, the spray 305 is branched into two flows to pass through passages 309a and 309b in an air atomizer 308, and is injected from injection nozzles 310a, 310b as shown in FIG. 9A and FIG. 9B. The atomizer 308 is fixed to an injector 315 by an air gallery 314 through an insulator 313.

Figure 9D:
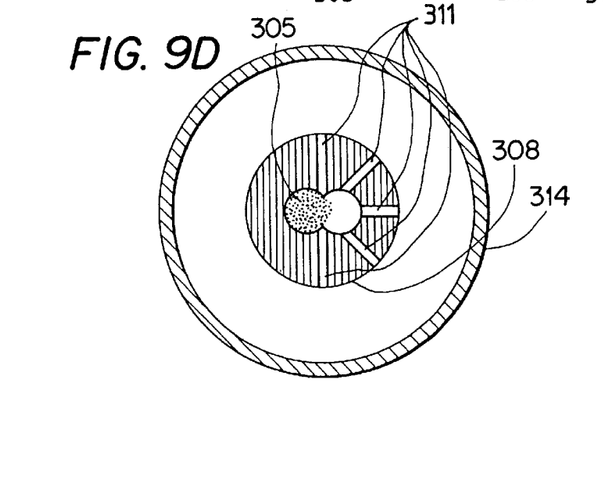

On the other hand, in a case where the required number of the fuel spray flows is one, air enters from air orifices 311. The fuel spray is atomized by the energy of the air flows from the air orifices 311 provided in the air atomizer 308 and at the same time flows on the side of the passage 309b due to the air flows, as seen in FIG. 9D. Thereby, as shown in FIG. 9B, the fuel flow becomes a spray of one direction flow from the injection nozzle 310b.

Figures 10A, 10C:
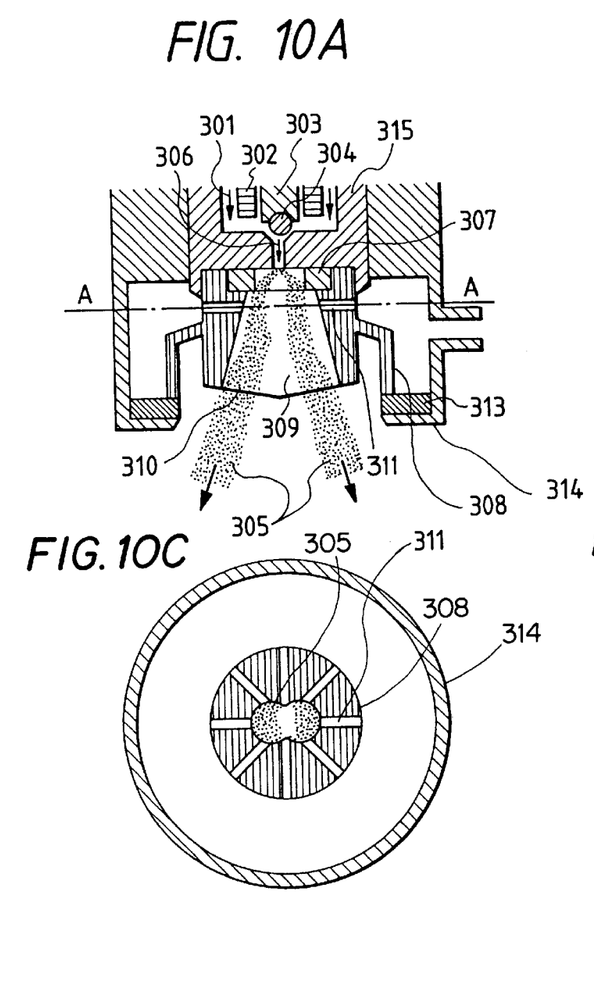
FIG. 10A and FIG. 10B are a plan view and a side view, respectively, showing the construction and the operation of a second embodiment of a fuel injecting valve in the first embodiment.
FIG. 10C and FIG. 10D are section views taken along line A—A in FIGS. 10A and 10B, respectively.
Figure 10B:
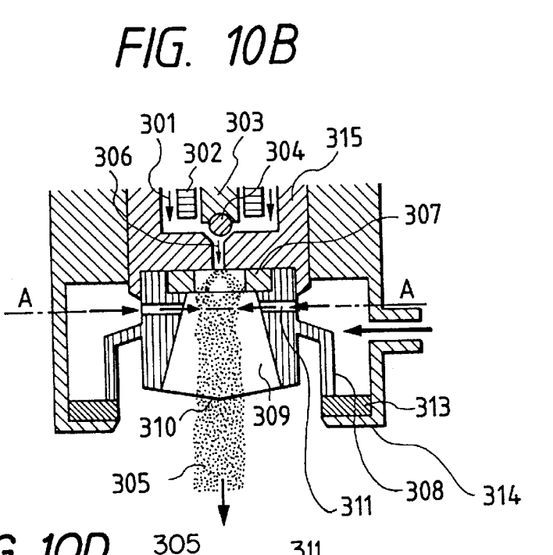

FIG. 10A and FIG. 10B show the construction of a second embodiment of a fuel injecting valve. The amount of the fuel is determined, similar to the first embodiment of the fuel injecting valve, by a function of the current flowing time in the coil 302 and the diameter of the fuel orifice 306. An elliptic cone-shaped passage 309 is provided in an air atomizer 308. The fuel discharged from the fuel orifice 306 is branched into two directions. In a case where the required number of the fuel spray flows is two, the spray 305 is, as shown in FIG. 10A and FIG. 10C, branched into two flows to pass through a passage 309 in the air atomizer 308, and is injected from an injection nozzle 310.

Figure 10D:
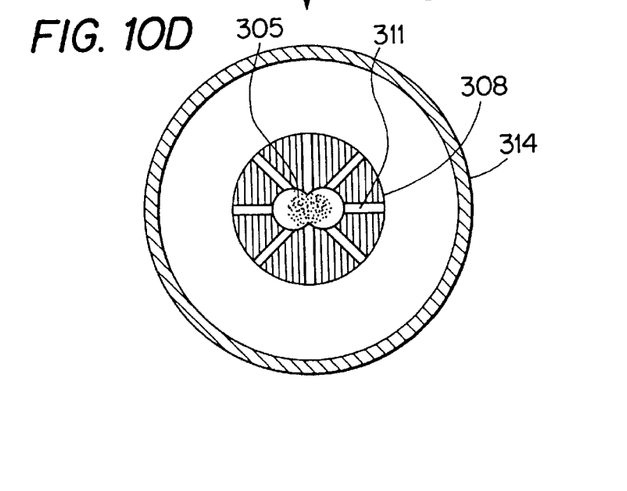

In a case where the required number of the fuel spray flows is one, air enters from air orifices 311. The fuel spray is, as shown in FIG. 10B, atomized by the energy of the air flows from the air orifices 311 provided in the air atomizer 308 and at the same time the fuel flow is confined to the center of the passage 309 due to the air flows, as seen in FIG. 10D. Thereby, the fuel flow becomes a spray of one direction flow from the injection nozzle 310, and a dense mixture is formed in the vicinity of a spark plug 104 in a combustion chamber 103.

Figure 11A:
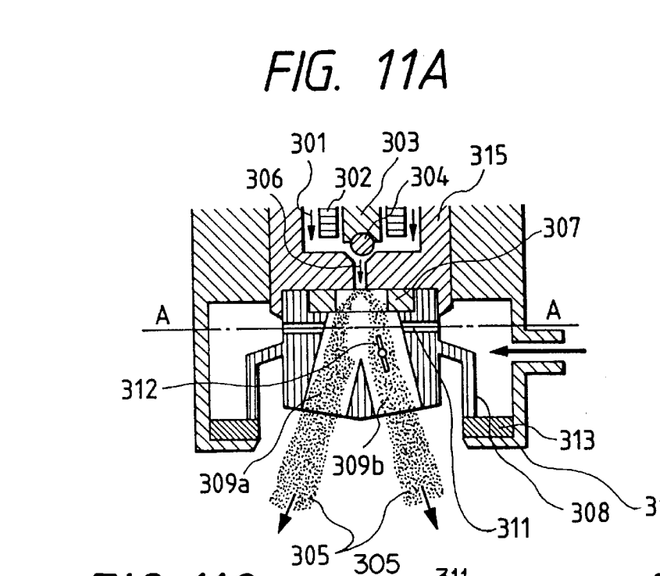
FIG. 11A and FIG. 11B are a plan view and a side view, respectively, showing the construction and the operation of a third embodiment of a fuel injecting valve in the first embodiment.
Figure 11B:
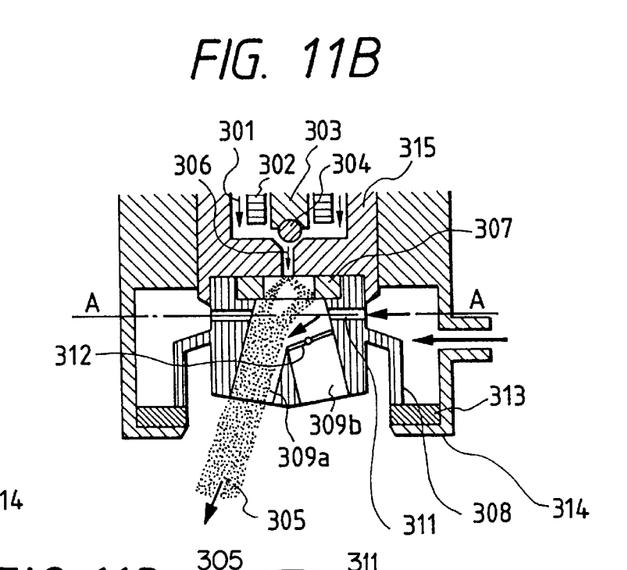
Figure 11C:
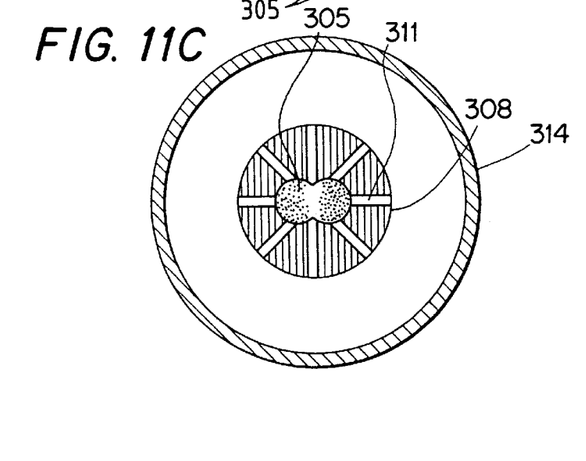
FIG. 11C and FIG. 11D are section views taken along line A—A in FIGS. 11A and 11B, respectively.
Figure 11D:
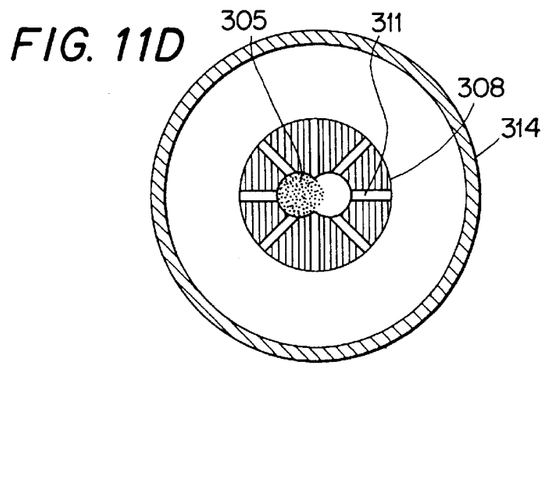

FIG. 11A and FIG. 11B show the construction of a third embodiment of a fuel injecting valve. In this figure, the construction in the up-stream end of the fuel orifice 306 is the same construction as in the previous embodiments. Inside a fuel passage 309a, representing one of fuel passages 309a and 309b, a micro-valve 312 for choking the fuel passage 309a is provided. In a case where the required number of the fuel spray flows is two, the micro-valve 312 is kept open, as shown in FIG. 11A, and in a case where the required number of the fuel spray flows is one, the micro-valve 312 is closed, as seen in FIG. 11B. By constructing the fuel injection valve in this way, the fuel spray is atomized by the energy of the air flows from the air orifices 311 provided in the air atomizer 308, and at the same time the number of the spray flows can be changed, as seen in FIGS. 11C and 11D. And, it is possible to compromise the stratification of the mixture in the combustion chamber 103 and rapid formation of the mixture by atomization of the fuel spray. Thereby, lean combustion can be improved.

Figure 12:
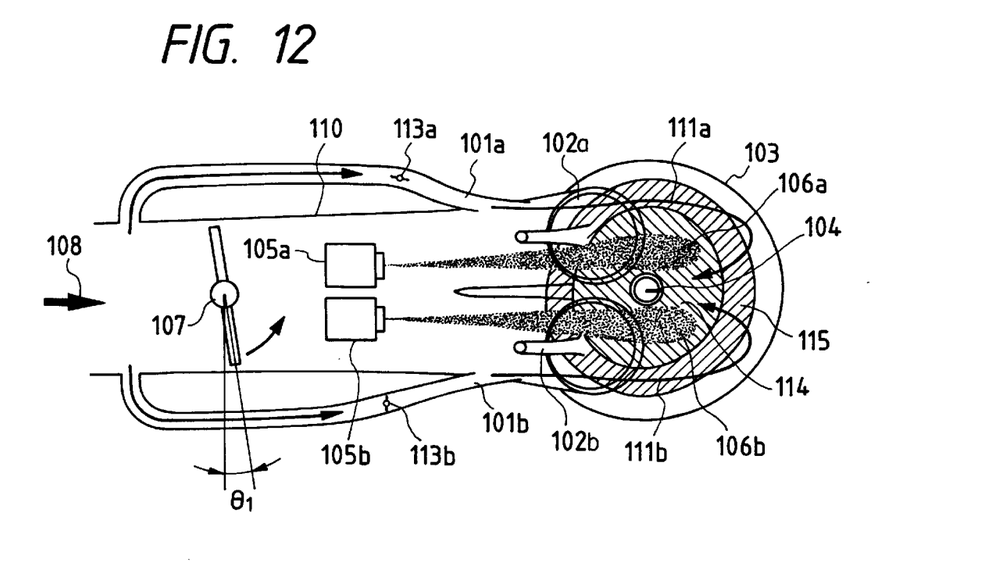
FIG. 12 is a diagrammatic plan view showing the construction of a second embodiment in accordance with the present invention.
Figure 13:
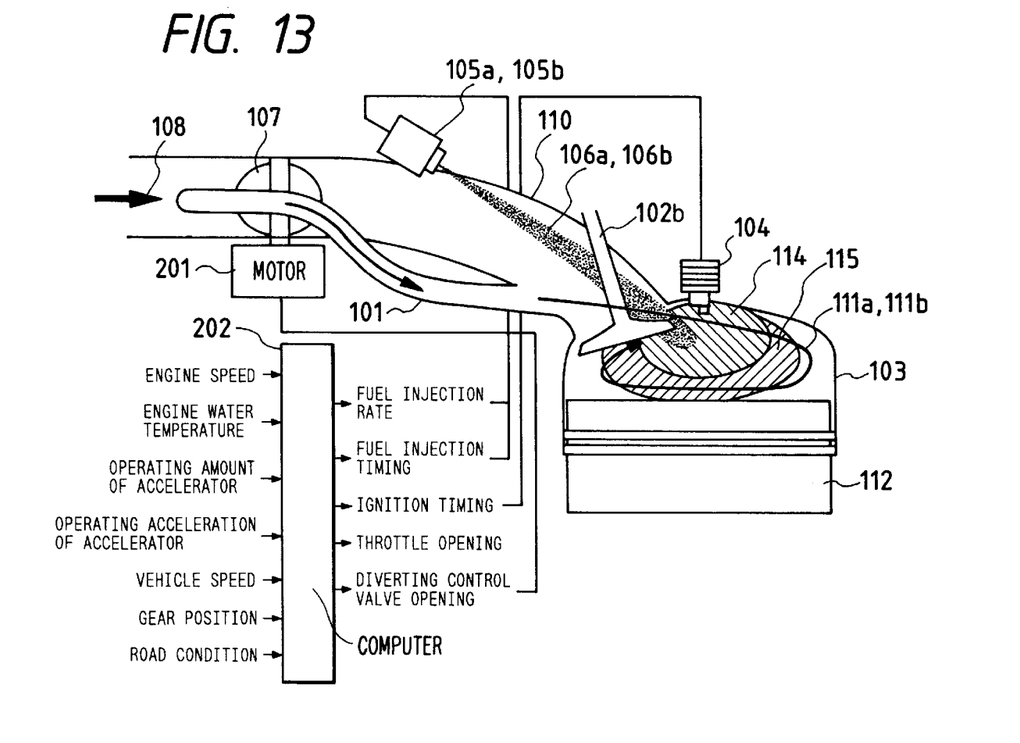
FIG. 13 is a diagrammatic side view showing the construction of the second embodiment in accordance with the present invention.

FIG. 12 and FIG. 13 show the construction of a second embodiment of an air-fuel mixture supply apparatus for an internal combustion engine according to the present invention. Although the construction of a swirl generating mechanism is basically the same as the construction in the first embodiment shown in FIG. 1, in this embodiment two fuel injecting valves 105a, 105b are provided in the up-stream portion of the two intake valves 102a and 102b, each positioned to direct a respective fuel spray toward the inside portion of one of the two intake valves, respectively. In a case where the number of fuel spray flows is one, the pulse signal from a computer 201 is given only to the fuel injecting valve 105a. Thereby, the fuel spray is deviated to perform stratified combustion.

Figure 14:
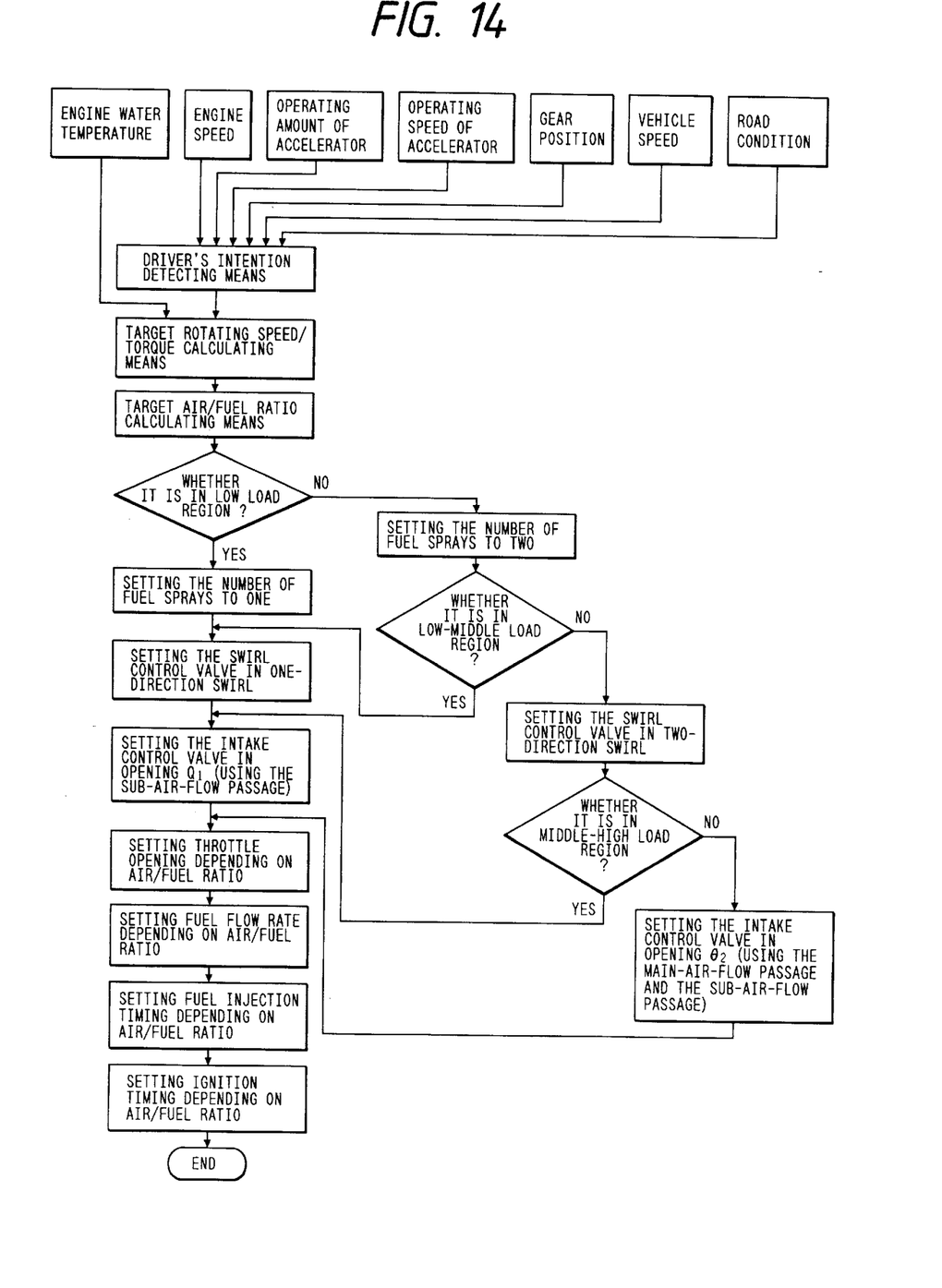
FIG. 14 is a flow-chart of an embodiment for setting the opening degree of a control valve.

FIG. 14 is a flow-chart of an embodiment for setting the states of the control valve and the fuel injecting valve when the air-fuel mixture supply apparatus for an internal combustion engine according to the present invention is applied to an engine mounted on a vehicle. Firstly, the intention of a driver is detected, and the required rotating speed and torque of the engine are calculated. The intention of the driver is expressed by a value calculated as a necessary shaft horsepower from, for example, the degree of actuation or the change in the degree of actuation of an accelerator. An operating condition of the engine, that is, the rotating speed and torque required now, is calculated from the value and the information on speed of the vehicle and the gear position. Next, based on this information, an optimum swirl and the number and the direction of spray flows under a set condition are searched for in a map stored in memory.

Firstly, it is judged whether the operating condition of the engine is in a high load region. If it is in the high load region, the opening degree of the control valve 107 in FIG. 1 is set to $\Theta 2$, and the direction of the spray flows is set to two directions, while lessening the derivation by cutting or decreasing the air flow through the air orifices 311, as shown in FIG. 7. If it is not in the high load region, the opening of the control valve 107 is set to $\Theta 1$, as shown in FIG. 3, FIG. 4 and FIG. 5, and then the processing advances to setting of the swirl and the spray.

In setting the swirl and the spray, firstly, it is judged whether the operating condition is in a region above the low and middle load region. If it is in a region above the low and middle operating region, the direction of spray flows is set to two directions by opening the swirl control valves 113a, 113b. And further, it is judged whether the operating condition is in the middle and high load region. If it is in the middle and high load region, the direction of spray flows is set to two directions by decreasing the air flow through the air orifices 311 in the same way as in the case of the high load region. If it is not in the middle and high region, the operating condition is consequently in the low and middle load region and therefore the direction of the spray flow is set to one direction by increasing the air flow rate flowing through the air orifices 311.

Finally, if the operating condition of the engine is not in a region above the low and middle load region, it is consequently in the low load region and the direction of the spray flow is set to one direction swirl by opening the swirl control valve 113a and closing the swirl control valve 113b. And further, the air flow rate flowing through the air orifices 311 is increased and the number of spray flows is set to one flow.

Since the conditions with regard to the swirl and the fuel are determined, the target air-fuel ratio is searched for in an air-fuel map in memory determined by the rotating speed and the torque. Based on the air-fuel ratio, the opening degree of the throttle, not shown, is determined and the air flow rate is set. Thereby, the fuel flow rate is set, and setting is performed on the fuel injection timing and the ignition timing corresponding to the air-fuel ratio by using means such as map or the like. By doing this, it can be possible to generate an optimum swirl and an optimum mixture in the combustion chamber corresponding to operating conditions.

Figure 15A:
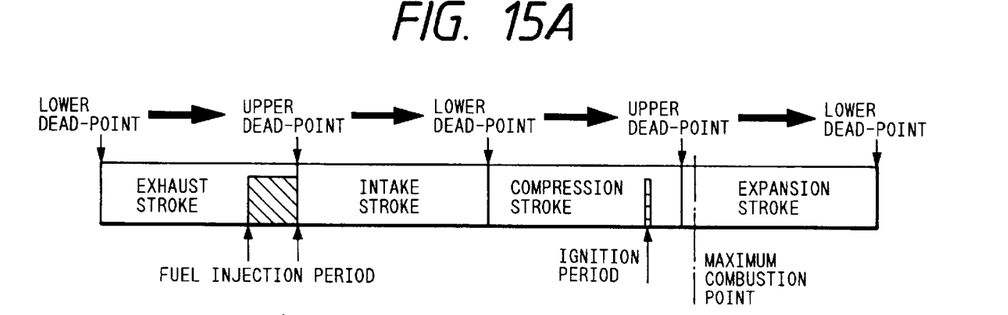
FIG. 15A and FIG. 15B are diagrams showing the fuel injection timing, the ignition timing and the direction of fuel injection when swirl is not generated in a combustion chamber.
Figure 15B:
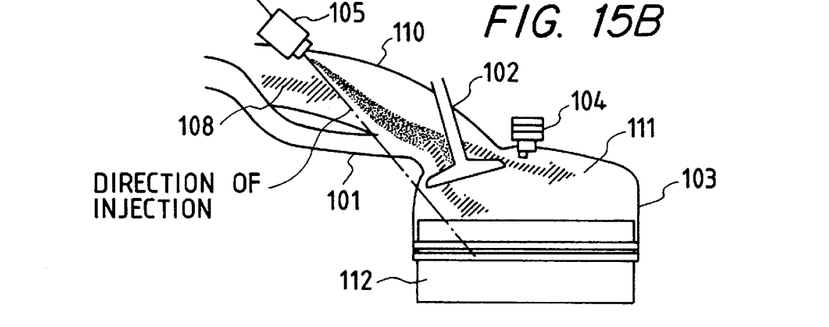
Figure 16A:
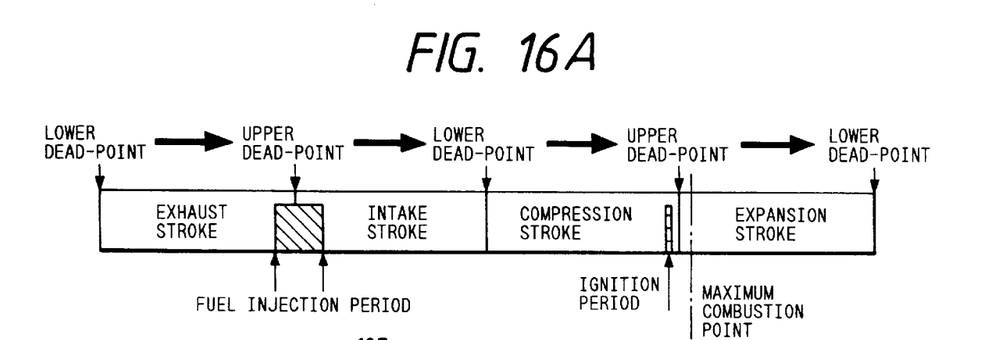
FIG. 16A and FIG. 16B are diagrams showing the fuel injection timing, the ignition timing and the direction of fuel injection when a swirl is generated in a combustion chamber.
Figure 16B:
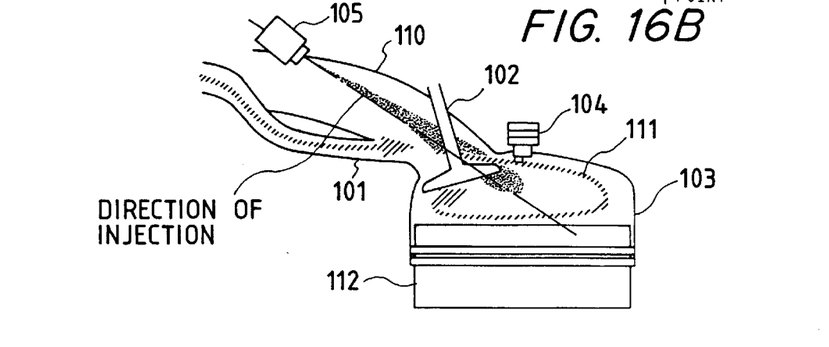

FIG. 15A, 15B and FIG. 16C show an operation where the fuel injection timing, the ignition timing and the direction of fuel injection are varied corresponding to the strength of the swirl. An air assisted injector is used for the fuel injecting valve 105. The air assisted injector is capable of promoting atomization of fuel by air flow and changing the number of spray flows and the direction of fuel injection by the air for atomization. FIG. 15B illustrates a case where no swirl is generated. The air 108 enters from the main passage 110, and the velocity of the air is comparatively slow and the combustion speed is also slow. In order to provide good firing when a piston 112 comes near the upper dead point in the compression stroke, the fuel injection timing should be set rather in advance and the ignition timing should be also set in advance. The direction of fuel spray 106 is set so as to be directed in a slightly downward direction from the line connecting between the fuel injecting valve 105 and the two intake valves 102a, 102b in FIG. 12 and to inject a large amount of fuel in that direction. By doing so, a dense mixture is formed in the vicinity of the ignition plug 104. FIG. 16A, 16B illustrates a case where a swirl is generated. The air 108 enters from the sub-intake passage 101, and a swirl having a fast velocity is formed. The combustion speed becomes fast. In order to provide good firing when the piston 112 comes near the upper dead point in the compression stroke, the fuel injection timing should be set rather behind as compared to the case of FIG. 15A and the ignition timing should be also set behind. Since the fuel flow and the sucked air flow hardly interfere each other, the direction of the fuel spray 106 is set so as to be directed at the two intake valves 102a, 102b more linearly than in the case of FIG. 15B. By doing so, mixing of the fuel and the air can be promoted and the fuel spray can be suppressed from adhering to the inner wall of the intake pipe 110 and to the inner wall of the cylinder 103.

Figure 17:
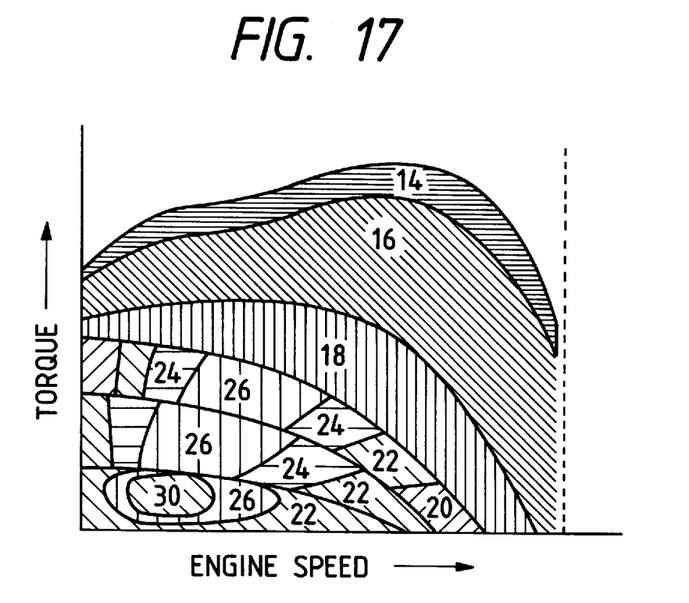
FIG. 17 is a graph showing the limit region of lean air-fuel ratio and the capable range of engine operation when the number of the sub-intake passages to be used and the number of fuel injections are varied according to the flow-chart shown in FIG. 14 by using the construction of the first embodiment.
Figure 18:
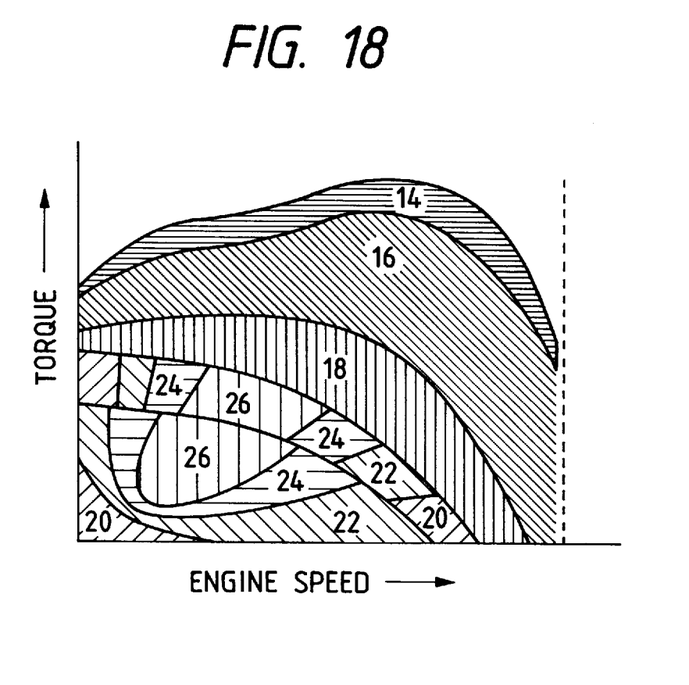
FIG. 18 is a graph showing the limit region of lean air-fuel ratio and the capable range of engine operation when the number of fuel injections from the fuel injecting valve is always set to two by using the construction of the first embodiment.
Figure 19:
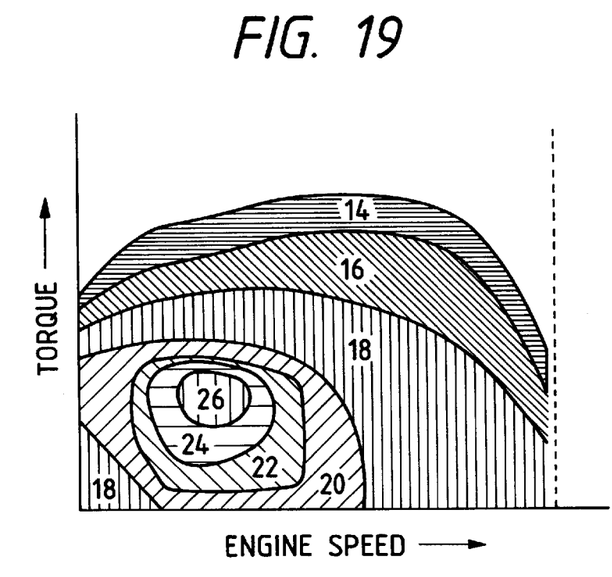
FIG. 19 is a graph showing the limit region of lean air-fuel ratio and the capable range of engine operation for a conventional engine with a swirl generating mechanism.
Figure 20:
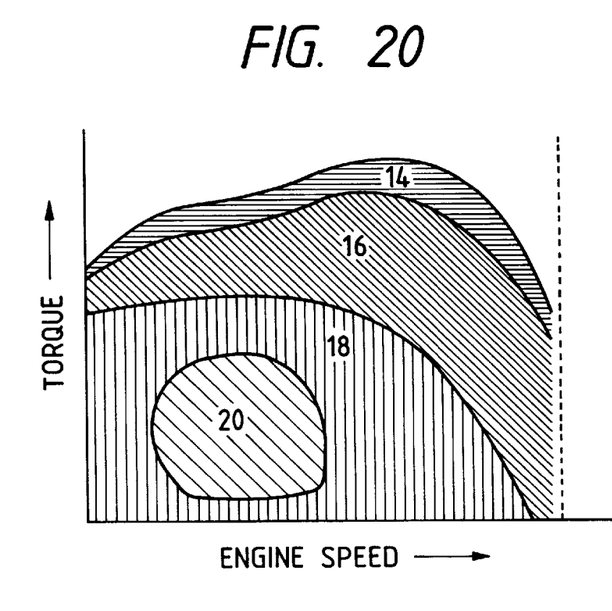
FIG. 20 is a graph showing the limit region of lean air-fuel ratio and the capable range of engine operation for a conventional engine without any swirl generating mechanism.

FIG. 17 shows the limit region of lean air-fuel ratio and the capable range of engine operation for the variables of engine rotating speed and torque when the number of the sub-intake passages to be used and the number of fuel injections are varied according to the flow-chart shown in FIG. 14 by using the construction of the first embodiment. FIG. 18 shows the limit region of lean air-fuel ratio and the capable range of engine operation when the number of fuel injections is set to two by using the construction of the first embodiment. FIG. 19 shows the limit region of lean air-fuel ratio and the capable range of engine operation for a conventional engine with a swirl generating mechanism. FIG. 20 shows the limit region of lean air-fuel ratio and the capable range of engine operation for a conventional engine without any swirl generating mechanism.

In each of the figures, the region outside of the diagonally shaded area indicates a region where the operation is not applicable with the rotating speed and the torque by each of the constructions. The numerals in the figures indicate the limit of the air-fuel ratio in each of the regions. It can be understood from FIG. 17 that the region capable of operating the engine with lean air-fuel ratios according to the present invention is wider than that of the other cases. More particularly, the limit region capable of operating the engine with a lean air-fuel ratio during low load operation is large, which leads to a decrease in fuel consumption rate and a suppression in exhausting HC, $NO_x$. Further, it can be also understood that the engine according to the present invention can maintain maximum power at the same level as that of the engine without any swirl generating mechanism.

While each of the embodiments according to the present invention has been described, it is to be understood that the present invention is not limited to the aforementioned embodiments and that various changes in the design may be resorted to without departing from the present invention described in the claims.

For example, although the case, where the number of the sub-intake passages is two, has been described in the embodiment, the construction according to the present invention is not limited to that number and it is obvious that ar. arbitrary number, including at least one, of the sub-intake passage can generate a swirl. Further, although the cases where the number of swirls is one and two have been described, a plurality of swirls can be generated in the combustion chamber by variably setting the positions and the directions of the opening portions of each of the sub-intake passages. Furthermore, although the cases where the number of fuel injections is one and two have been described, the number can actually increase with the number of the swirls. Even with such a construction, when the purpose is to perform stratified combustion, at least one spray flow may be sufficient. In any case, so long as the swirl and the fuel spray are set such that the swirl may three-dimensionally enfold the fuel spray, the fuel does not adhere to the wall of the combustion chamber and a preferable mixture can be formed.

In any of these cases, it goes without saying that by varying the fuel injection timing and so on, the mixing of air and fuel can be promoted and an optimum combustion can be obtained.

It can be understood from the aforementioned description that, according to the present invention, a plurality of swirls can be generated in the combustion chamber, the swirls generated in the combustion chamber can be set to a proper strength over a wide operating range and the lean combustion limit can be extended, the hazardous components such as HC, $NO_x$ and so on in the exhaust gas can be deceased, and a decrease in the output power can be prevented with sucking a large quantity of air during a high load operation by eliminating elements which reduce the cross-sectional area of the main air flow passage.

What is claimed is:

1. An air-fuel mixture supply apparatus for an internal combustion engine having an air intake passage opening to a combustion chamber in a cylinder of the engine, an intake valve provided in a junction between said intake passage and said combustion chamber, a nozzle of a fuel injection valve for injecting at least one of plural branched fuel spray flows toward said intake valve, swirl generating means for generating a vortex flow in a mixture of air and fuel in said combustion chamber by controlling air flow in said intake passage, wherein:

said swirl generating means comprises a main passage forming said air intake passage, at least two sub-intake passage provided to form by-pass passages to by-pass air around said main passage and formed such that the total sum of the cross-sectional areas thereof is smaller than the cross-sectional area of said main passage, an air intake control valve for controlling air flow in said main passage, choke means for selectively controlling air flow in said at least one of said sub-intake passages, and means for performing control to vary the number of said sub-intake passages being used by controlling said choke means to control the cross-sectional area of said at least one of the sub-intake passages according to the operating state of the internal combustion engine.

2. An air-fuel mixture supply apparatus for an internal combustion engine according to claim 1, which further comprises:

means for judging an operating state of said internal combustion engine by using the rotating speed and torque of the internal combustion engine and means for performing control to vary the direction of fuel injection and the number of fuel spray flows according to the judged operating state of the internal combustion engine.

3. An air-fuel mixture supply apparatus for an internal combustion engine according to claim 1, wherein:

said means for performing control to vary the direction of fuel injection and the number of fuel spray flows operates so that the vortex flow circulates always to enfold the fuel spray in the combustion chamber when the vortex flow is generated.

4. An air-fuel mixture supply apparatus for an internal combustion engine according to claim 1, wherein:

when intake flows from a plurality of sub-intake air passages generate at least two vortex flows having different vortex forming surfaces and the internal combustion engine is in a low load operating state, said means for performing control to vary the number of said sub-intake passages being used and the cross-sectional area of each of the sub-intake passages and said means for performing control to vary the direction of fuel injection and the number of fuel spray flows operate so that at least one of the vortex flows is formed in a portion of the combustion chamber where it will not interfere with a fuel spray flow.

5. An air-fuel mixture supply apparatus for an internal combustion engine having an air intake passage opening to a combustion chamber in a cylinder of the engine, an intake valve provided in a junction between said intake passage and said combustion chamber, a fuel injection valve for injecting at least one fuel spray flow toward said intake valve, swirl generating means for generating a vortex flow in a mixture of fuel and air in said combustion chamber by controlling air flow in said intake passage, wherein:

said swirl generating means comprises a main passage forming said air intake passage, at least one sub-intake passage provided to form a by-pass passage to by-pass air around said main passage and formed such that the total sum of the cross-sectional areas thereof is smaller than the cross-sectional area of said main passage, an intake control valve for controlling air flow in said main passage, means for performing control to choke air flow in said at least one of said sub-intake passages, and means for generating a vortex flow in the form of a swirl with varying strength in said combustion chamber according to an operating state of the internal combustion engine, which further comprises:

means for varying fuel injecting directions corresponding to the strength of said swirl created by the operating state of the internal combustion engine.

6. An air-fuel mixture supply apparatus for an combustion engine according to claim 5, which further comprises:

means for varying each of the fuel spray flow rates corresponding to the strength of said swirl created by the operating state of the internal combustion engine.

7. An air-fuel mixture supply apparatus for an internal combustion engine according to claim 5, which further comprises:

means for varying fuel injection timings corresponding to the strength of said swirl created by the operating state of the internal combustion engine.

8. An air-fuel mixture supply apparatus for internal combustion engine according to claim 5, which further comprises:

means for varying ignition timing corresponding to the strength of said swirl created by the operating state of the internal combustion engine.

9. An internal combustion engine with an air-fuel mixture supply apparatus having an air intake passage connected to a combustion chamber in each of the cylinders of said internal combustion engine, an intake valve for introducing air from said air intake passage into each combustion chamber by opening during an intake stroke of each of said cylinders an intake valve being provided between said air intake passage and each combustion chamber, and a fuel injection valve for supplying fuel to the combustion chamber in each of said cylinders, which comprises:

an air or air-fuel mixture supply unit having an injection nozzle for producing a thin air or air-fuel mixture flow with a directivity toward said intake valve, the diameter of the injection nozzle being smaller than the diameter of said intake valve, which comprises:

a control unit for controlling the flow direction of the fuel injected from said fuel injection valve according to an operating state of the internal combustion engine, wherein said fuel injection valve is capable of selective fuel spray directions.

10. An internal combustion engine with an air-fuel mixture supply apparatus according to claim 9, wherein:

at least two intake valves are provided for each of the cylinders and said air or air-fuel mixture supply unit allocates a flow of fuel to each of said intake valves.

11. An internal combustion engine with an air-fuel mixture supply apparatus according to claim 10, which comprises:

a control unit for controlling the number of the fuel spray flows injected from said fuel injection valve according to an operating state of the internal combustion engine.

12. An internal combustion engine with an air-fuel mixture supply apparatus comprising an air intake passage connected to a combustion chamber in each of the cylinders of said internal combustion engine, an intake valve for introducing air from said air intake passage into said combustion chamber by opening during an intake stroke of each of the cylinders, an intake valve being provided between said air intake passage and each combustion chamber, an air supply unit having an injection nozzle for producing a thin air flow having a directivity toward said intake valve, the diameter of the injection nozzle being smaller than the diameter of said intake valve, and a fuel injection valve for supplying fuel into the air flow discharged from said air supply unit, which comprises:

a control unit for controlling the flow direction of fuel injected from said fuel injection valve according to an operating state of the internal combustion engine, wherein said fuel injection valve is capable of selective fuel spray directions.

13. An internal combustion engine with an air-fuel mixture supply apparatus according to claim 12, wherein:

at least two intake valves are provided for each of the cylinders and said fuel injection valve selectively allocates a flow of fuel to each of said intake valves.

14. An internal combustion engine with an air-fuel mixture supply apparatus according to claim 13, which comprises:

a control unit for controlling the number of fuel spray flows injected from said fuel injection valve according to an operating state of the internal combustion engine.

15. An internal combustion engine with an air-fuel mixture supply apparatus according to claim 12, wherein:

an air supply unit is allocated for each of the intake valves.

16. An internal combustion engine with an air-fuel mixture supply apparatus according to claim 15, which comprises:

a control unit for controlling the flow direction of air flowing from said air supply unit according to an operating state of the internal combustion engine.

17. An internal combustion engine with an air-fuel mixture supply apparatus according to claim 15, which comprises:

a control unit for controlling the flow strength of air flowing from said air supply unit according to an operating state of the internal combustion engine.

* * * * *